R. N. EGGLESTON.
GROUND STAKE.
APPLICATION FILED NOV. 27, 1916.
1,308,940.
Patented July 8, 1919.
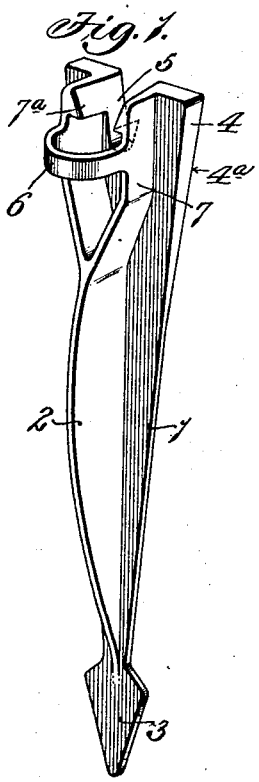
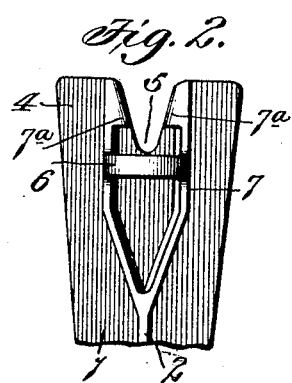
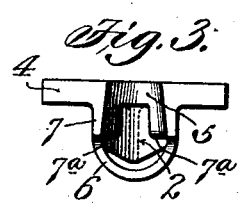
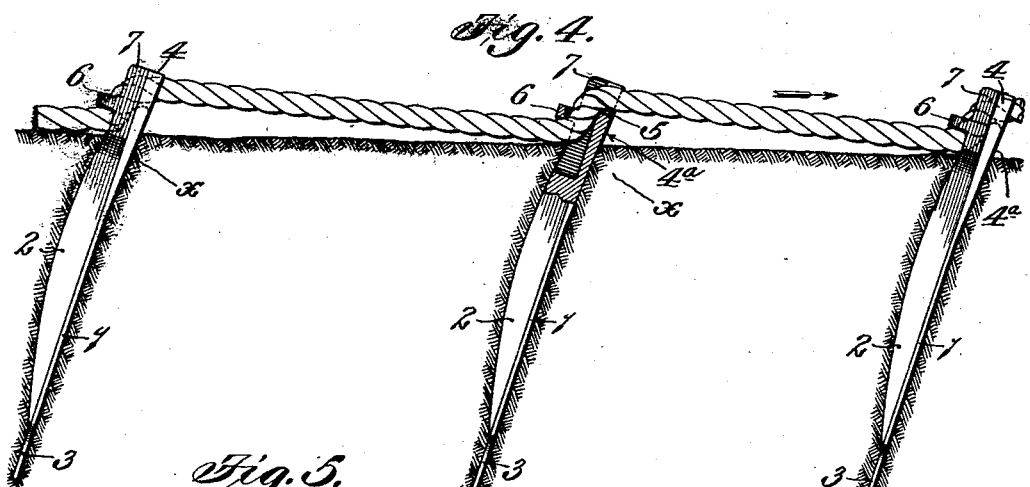
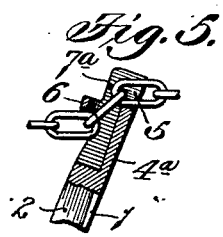
Inventor,
R. N. Eggleston.
By Bakewell & Cline, Attys.
THE COLUMBIA PLANOGRAPH CO., WASHINGTON, D. C.

UNITED STATES PATENT OFFICE.

ROBERT N. EGGLESTON, OF ST. LOUIS, MISSOURI, ASSIGNOR TO MULTIPULL MANUFACTURING COMPANY, OF ST. LOUIS, MISSOURI, A CORPORATION OF MISSOURI.

GROUND-STAKE.

1,308,940. Specification of Letters Patent. Patented July 8, 1919.

Application filed November 27, 1916. Serial No. 133,712.

*To all whom it may concern:*

Be it known that I, ROBERT N. EGGLESTON, a citizen of the United States, residing at St. Louis, Missouri, have invented a certain new and useful Improvement in Ground-Stakes, of which the following is a full, clear, and exact description, such as will enable others skilled in the art to which it appertains to make and use the same.
This invention relates to ground stakes of the kind that are used for anchoring a windlass or other pulling device to the ground, such, for example, as a device of the kind shown in my Patent No. 1,177,767, dated April 4, 1916.

One object of my present invention is to provide a ground stake which is so constructed that either a rope or chain can be used with same for connecting the stake with the object or device that the stake anchors.

Another object is to provide a ground stake which is so constructed that the portion of the rope or chain that extends between a plurality of stakes arranged in the ground in tandem relation can be drawn perfectly taut, thereby causing all of the stakes to act together or collectively to resist the pulling strain that the rope or chain is subjected to.
Another object is to provide a ground stake having the characteristics above referred to and constructed in such a manner that it can be driven into the ground without liability of damaging the rope or chain that is arranged in engagement with the stake.

Another object is to provide a ground stake which is equipped with means that causes the portion of the ground against which the upper end of the stake bears when it is in use, to be packed or compressed solidly during the operation of driving the stake into the ground, thereby insuring a solid surface against which the stake bears, when the chain or rope connected to the stake is subjected to a pulling strain.

And still another object is to provide a ground stake which is so constructed that the chain or rope which the stake anchors can be utilized to pull the stake out of the ground, when it is desired to remove the stake.

Figure 1 of the drawings is a perspective view of a ground stake constructed in accordance with my invention.

Fig. 2 is a front elevational view of the upper end portion of said stake.

Fig. 3 is a top plan view of the stake.

Fig. 4 is a view, illustrating a plurality of stakes constructed in accordance with my invention arranged in tandem relation in the ground; and Fig. 5 is a detail view, partly in vertical section, illustrating a chain arranged in engagement with my improved stake.

In the preferred form of my invention, as herein shown, the shank of the stake consists of a flat web 1 that is tapered or substantially wedge-shaped and a reinforcing and strengthening flange 2 that projects laterally from the rear side of said web at substantially right angles to same, the upper edge of said flange 2 being inclined downwardly toward the lower end of the shank and merging at its lower end into the web 1. The web 1 is provided at its lower end with an arrow-shaped piercing point 3, and said web is preferably provided at its upper end with a thickened portion 4 whose front face $4^a$ is disposed at an angle to the rear face of the web 1, so as to form a wedge-shaped portion at the upper end of the shank of the stake that will pack or compress the portion $x$ of the ground lying in front of the stake, during the operation of driving the stake into the ground, and thus insure a firm or solid surface against which the upper end of the stake bears when it is in use, the stake being intended to be driven into the ground with its upper end inclined toward the direction that the strain or pull is applied, as shown in Fig. 4.

The stake is provided at its upper end with a means by which either a rope or a chain can be securely connected to the stake. Said means preferably consists of a substantially V-shaped notch 5 formed in the thickened portion 4 of the web of the stake, and a bail or substantially U-shaped member 6 that projects laterally from the rear side of the web at approximately right angles to the web, said bail being arranged in such a position with relation to the notch 5 that it will form a kink in the rope or chain that passes through the bail when said rope or chain is subjected to a pull or strain in the direction indicated by the arrow in Fig. 4, and thus effectively prevent the rope or chain from slipping relatively to the stake. It is immaterial, so far as my broad idea is concerned, how the bail 6 is combined with the web of the stake, but I prefer to form said bail integral with a pair of vertically-disposed flanges 7 on the rear side of said web whose lower end portions converge and merge into the reinforcing flange 2. The member used to connect the stake with the object to be anchored may either consist of a rope, a cable or a chain. Said flexible member is preferably first slipped through the bail 6 and laid in the notch 5, and thereafter, the stake is driven into the ground in the manner shown in Fig. 4, namely, with its upper end inclined in the direction that the strain or pull is applied. It is not essential, however, that the flexible member be arranged in engagement with the stake prior to the operation of driving the stake into the ground, for, if desired, the stake can be first driven and the flexible member thereafter arranged in engagement with same. When the flexible member is subjected to a pull in the direction indicated by the arrow in Fig. 4, it will be forced downwardly into snug engagement with the tapered side walls of the notch 5, the bail 6, which lies above the flexible member, coöperating with the notch 5 to cramp the flexible member and bind it tightly to the stake. As the strain or pull on the flexible member is increased, said member will be drawn more tightly into engagement with the walls of the notch 5 and with the lower edge of the bail 6, thereby causing the cramping pressure on the flexible member to be increased as the strain or pull on said member increases. If it is desired to take up slack in the flexible member between the stake and the object to be anchored, this can be accomplished easily by drawing the flexible member rearwardly through the notch and bail at the upper end of the stake. This is a feature that adds greatly to the efficiency of a ground stake, for when a plurality of stakes are arranged in the ground in tandem relation, as shown in Fig. 4, it is desirable to have the portions of the flexible member between the stakes perfectly taut, so that all of the stakes will act together, or act collectively, to resist the pull that the flexible member is subjected to. In my improved stake the portions of the flexible member that lie between the stakes can be drawn perfectly taut in the manner previously described, and consequently, when the pulling operation is started, all of the stakes will act as a unit to resist the pull, owing to the fact that the portion of the member lying between the first and second stakes acts immediately to transmit the pull on the first stake to the second stake, and the portion of the flexible member lying between the second and third stakes acts immediately to transmit the pull on the second stake to the third stake.

The notch 5 in the upper end of the stake is preferably made deep enough so that the flexible member will lie far enough below the upper end of the stake, when the stake is being driven, to prevent said member from being damaged by the hammer or instrument used to drive the stake into the ground. The thickened portion 4 at the upper end of the stake not only acts to solidify and pack the ground in front of the stake, but said thickened portion also forms a relatively broad striking surface at the upper end of the stake which facilitates the operation of driving the stake into the ground and also eliminates the liability of injuring the stake by striking it a sharp blow with a heavy instrument.

In practice I prefer to cast the stake in one piece, so as to reduce the cost of manufacturing same and insure a strong and rigid structure, but as previously intimated, it is not essential that the bail 6 at the upper end of the stake be integrally connected to the web. Furthermore, while I prefer to provide the stake with a shank that is substantially T-shaped in cross section, this is not essential, as the shank could be formed in various other ways without departing from the spirit of my invention.

In view of the fact that the flexible pulling member passes under the bail 6, said member can be looped around the bail by grasping the two portions of same lying at the front of and at the rear of the bail and used to pull the stake out of the ground. If desired, the flanges 7 can be provided on their inner sides with lugs 7ª which are so disposed that when a chain is connected to the stake the lugs 7ª will act as an abutment for one link of the chain, and thus prevent the chain from pulling loose when the stake is inclined forwardly at a sharp angle or arranged in a position nearly parallel to the direction of pull.

Having thus described my invention, what I claim, and desire to secure by Letters Patent, is:

1. A device for securing a rope, chain or other flexible member, consisting of a ground stake provided at its upper end with a surface over which the flexible member is passed, and a bail on the rear side of said stake under which said flexible member is passed, said bail being so arranged with relation to the surface at the upper end of the stake over which the flexible member passes that it will cause a kink to be formed in said flexible member when said member is subjected to a forward pull.

2. A device for securing a chain, rope or other flexible member, consisting of a ground stake provided at its upper end with a notch for receiving the flexible member that is to be secured, and a rigid bail on the rear side of said stake under which said flexible member passes, said bail being so proportioned and arranged with relation to said notch that it will cause a kink to be formed in said flexible member when said member is pulled forwardly.

3. A device for securing a chain, rope or other flexible member, consisting of a ground stake provided at its upper end with a notch in which the flexible member is arranged, vertically-disposed flanges on the rear side of said stake arranged at opposite sides of said notch, and a substantially horizontally-disposed bail projecting rearwardly from said flanges at a point below said notch, the flexible member being adapted to be passed under said bail.

4. A device for securing a chain, rope or other flexible member, consisting of a ground stake provided with a longitudinally tapered web portion, a reinforcing flange on the rear side of said web that extends longitudinally of the stake, vertical flanges on the rear side of said stake whose lower ends converge and merge into said longitudinally-extending flange, a notch in the upper end of the web of the stake arranged between the said vertical flanges, and a substantially horizontally-disposed bail integrally connected to said vertical flanges and arranged far enough below said notch to cause a kink to be formed in a flexible member that passes through said notch and down under said bail.

5. A ground stake provided at its upper end with a notch for receiving the link of a chain, lugs on the rear side of said stake that form an abutment for the adjacent link of the chain, and a bail on the rear side of the stake under which the chain is adapted to be passed, said bail being arranged below the notch in the upper end of the stake.

ROBERT N. EGGLESTON.

Copies of this patent may be obtained for five cents each, by addressing the "Commissioner of Patents, Washington, D. C."